UNITED STATES PATENT OFFICE.

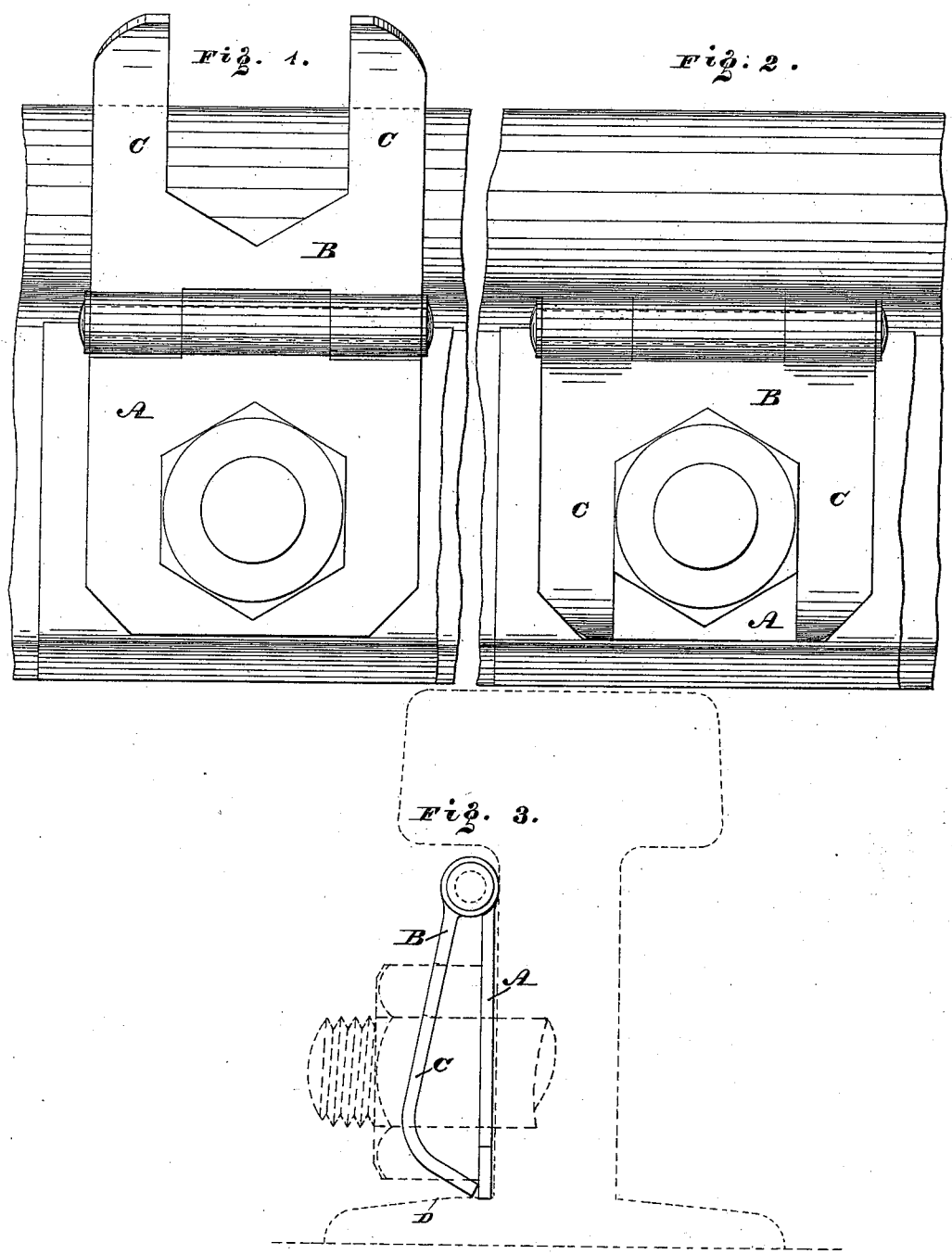

EDWARD F. REA, OF MANCHESTER, MINNESOTA.

NUT-LOCK.

SPECIFICATION forming part of Letters Patent No. 354,735, dated December 21, 1886.

Application filed July 27, 1886. Serial No. 209,197. (No model.)

*To all whom it may concern:*

Be it known that I, EDWARD F. REA, a citizen of the United States, residing at Manchester, in the county of Freeborn, State of Minnesota, have invented a new and useful Improvement in Nut-Fasteners, which improvement is fully set forth in the following specification and accompanying drawings, in which—

Figures 1 and 2 represent front views of a nut-fastener embodying my invention, the same being in different positions. Fig. 3 represents a side elevation thereof.

Similar letters of reference indicate corresponding parts in the several figures.

My invention consists of a nut-fastener formed of a forked hinged plate, the legs whereof being curved, whereby they hold the nut at or about the center thereof, are easily removed, and, being elastic, are prevented from being broken when driven home on the nut, as will be hereinafter fully set forth.

Referring to the drawings, A represents the back plate of the fastener, which is shown as placed against a fish-plate of a railroad-rail and resting between the head and base of said rail.

B represents a plate which is hinged to the back plate, A, and slotted, bifurcated, or forked, forming legs C C, which are bent or curved outwardly, so that a space exists between the legs and said plate A, the said legs, which are curved outwardly at their lower portions, extending below the nut to the base of the rail or of the fish-plate, when used, being of such length as to require an upward pressure on the lower portion thereof, so as to bring their ends, which are sprung on the base of the rail, in contact with the back plate, in which position they are held in place by the base of the rail. The said plate B is constructed of rolled wrought-iron, so that the forked portions thereof may have elasticity, and thus be enabled to tightly clasp the nut, and they may be driven down thereon and pried out therefrom without liability of being broken.

It will be seen that when the nut is in position on the bolt the plate B is lowered, and its legs embrace the sides of the nut, so that the latter is held at or about its center, and thereby prevented from unscrewing, and as the legs are elastic, when they are forcibly driven home on the nut by a hammer, bar, or other implement they are prevented from being broken, this being due to their elastic nature. Again, when the nut is to be unscrewed, the plate B is raised clear of the nut, this being readily accomplished by a bar or other implement or tool introduced between the plates A B, so that the legs C may be pried out, and thus entirely disconnected from the nut, whereby the latter may be rotated.

I am aware that hinged arms constructed of material that may be readily bent in position have been used in connection with nuts for securing the same; but I am not aware that the same have been constructed of rolled wrought-iron, which, possessing, as it does, elasticity, is readily sprung when desired, so as to be released from the nut and thereby free the same.

Having thus described my invention, what I claim as new, and desire to secure by Letters Patent, is—

A nut-fastener composed of a back plate and a forked front plate, the latter hinged to the former, the legs thereof being bent outwardly at their lower portions, and of such length as to adapt them to be held on the base of the rail when sprung thereon and against the back plate, all substantially as described.

E. F. REA.

Witnesses:
W. E. TODD,
J. GIBBONS.